United States Patent [19]
Santoline et al.

[11] Patent Number: 5,826,060
[45] Date of Patent: Oct. 20, 1998

[54] STIMULATED SIMULATOR FOR A DISTRIBUTED PROCESS CONTROL SYSTEM

[75] Inventors: Linda L. Santoline, South Park; Louis W. Gaussa, Jr., Penn Township; Robert A. Shemony, Westmoreland; Deborah D. Broderick, Apollo; Thuy T. Tran, Pittsburgh, all of Pa.

[73] Assignee: Westinghouse Electric Corporation, Pittsburgh, Pa.

[21] Appl. No.: 628,586

[22] Filed: Apr. 4, 1996

[51] Int. Cl.$^6$ ........................ G06F 15/46
[52] U.S. Cl. ................. 395/500; 364/132; 364/139; 364/492; 364/578; 395/200.58; 395/840
[58] Field of Search .................. 364/513, 500, 364/550, 139, 578, 579, 492, 3, 4; 395/500, 888, 907, 915, 475, 468, 840, 200.58; 434/29, 62; 290/40 R

[56] References Cited

U.S. PATENT DOCUMENTS

| | | | |
|---|---|---|---|
| 3,573,450 | 4/1971 | Louis et al. ............................. | 235/185 |
| 4,427,896 | 1/1984 | Waldron .................................. | 290/40 |
| 4,975,865 | 12/1990 | Carrette et al. ......................... | 364/513 |
| 5,278,778 | 1/1994 | Akimoto et al. ........................ | 364/578 |
| 5,353,243 | 10/1994 | Read et al. .............................. | 364/578 |
| 5,474,453 | 12/1995 | Copperman .............................. | 434/29 |
| 5,588,132 | 12/1996 | Cardoza .................................. | 395/475 |
| 5,634,039 | 5/1997 | Simmon et al. ......................... | 395/500 |

*Primary Examiner*—Kevin J. Teska
*Assistant Examiner*—M. Irshadullah

[57] ABSTRACT

A simulator for a distributed process control system utilizes a simulator station as an interface between a plant modeling computer and an instrumentation and control system which uses actual distributed processing units (DPUs) running actual process control software. The simulator station memory maps sensor signals received from the plant modeling computer through reflective memory directly to a memory-mapped input/output (I/O) interface of each DPU at the scan rate, or a multiple of the scan rate, of the DPU, and provides the control signals generated by the DPUs to the plant modeling computer at the same rates. A data highway such as in the actual system provides communications between the DPUs and between the DPUs and operator stations, (and potentially other man-machine interface stations) which provide operator signals used by the DPUs. The simulator station is also connected to the operator stations by the data highway for receiving the operator signals which can include signals controlling simulator operation.

10 Claims, 9 Drawing Sheets

STIMULATED SIMULATOR FOR A DISTRIBUTED PROCESS CONTROL SYSTEM

BACKGROUND OF THE INVENTION

Field of the Invention

This invention relates to simulators for simulating operation of a distributed process control system.

Background Information

Distributed process control systems are becoming commonly used for control of complex processes including, but in no way limited to, processes in the energy, metals, and water/waste water fields. The energy segment includes both nuclear and non-nuclear power generation process control and plant computer applications. A distributed process control system includes a number of distributed processing units (DPUs), each of which controls certain segments of the overall process. Typically, the DPUs have digital processors running process control software, which generates control signals for the assigned portion of the process in response to sensor signals received from that portion of the process and to operator signals. The individual DPUs are connected together and to operator consoles by network communications. Parameter values generated by any of the DPUs which are needed by other DPUs are transmitted over the communications network.

Typically, the sensor signals generated in the plant are analog or logic signals. Each of the DPUs includes analog to digital (A/D) converters which digitize the analog signals and store the digital sensor signals. Periodically, the digital processor within the DPU retrieves the digitized sensor signals and converts them to parameter values for use in control algorithms or for transmission to other portions of the distributed system via the communications network. Different functions performed by the various DPUs have varying requirements for input of updates of the sensor values commensurate with that DPU. For instance, some control loops require updating the input signals at millisecond intervals, others require tens or hundreds of milliseconds, and still others only require updating at intervals of a second or more. Typically, functions requiring updates at the same rate are grouped in a common DPU. The result is that usually, the various DPUs have different requirements for updating of the sensor data.

As process control systems have become more complex, there has been an increased requirement for simulators for training operators and for simulating engineering upgrades in the process control system. Traditionally, plant process control simulators have utilized a single computer system which emulates modeling (via mathematical software), both the process and the process control system. This has not always proven to be satisfactory for distributed process control systems, as it has been found to be difficult to emulate the real time response of such a system, and to prove that the emulated system matches the system it attempts to model. Commonly owned U.S. patent application Ser. No. 08/282,854, filed on Jul. 29, 1994, addresses this problem by providing a simulator which utilizes actual distributed process units from the plant utilizing the real process control software. The process is emulated by a number of slave simulators, each simulating a portion of the process controlled by one or more of the DPUs, but under the control of a master simulator. Instead of providing sensor signals to the associated DPUs, the slave simulators of this system make the engineering or electrical conversions and insert digital values of the process parameters directly into the memory of the digital processors in the DPUs through direct memory access units.

While the system described in U.S. patent application Ser. No. 08/282,854, offers marked benefits over the prior simulator systems which emulated both the process and the distributed process control system, there is still room for improvement. This earlier system does not take into account the varying control frequencies of the different DPUs. Therefore, the earlier system time response may not be true to the actual plant system response. Also, many plant operators already have a computer model of their process, but it is not usable with the multiple slave simulators without modification to the modeling software. Furthermore, since the slave simulators inject the parameter values directly into DPU memory as engineering values, the conversion routines of the DPU are not exercised, which is an important feature for guaranteeing the stimulated simulation matches the actual plant at the I/O level interface.

There is a need, therefore, for an improved simulator for simulating the operation of distributed process controls systems.

Particularly, there is a need for such an improved simulator which better simulates the real response time of the distributed process control system.

There is also a need for such an improved simulator which also exercises the conversion routines of the DPUs.

There is a further need for such an improved simulator which does not require extensive modifications to the DPU application software and reuses actual system hardware components.

There is an additional need for such an improved simulator which can take advantage of existing computer plant models, especially without extensive modification to the plant model computer software.

SUMMARY OF THE INVENTION

These needs and others are satisfied by the invention which is directed to a simulator for a distributed process control system which utilizes distributed processing units (DPUs) like those of the actual distributed instrumentation and control system and implementing actual process control software. Modeling means, such as for example, an existing plant modeling computer, emulates the process and generates process signals, preferably in the form of sensor signals, in response to control signals generated by the DPUs using the actual process control software. The DPUs also respond to operator signals generated by an operator console. Communication means provide communication between the plurality of DPUs, and between the DPUs and the operator console. Stimulation means connected to each of the DPUs and to the modeling means transmits the process signals to the DPUs. In accordance with one aspect of the invention, the process signals are sensor signals which are mapped to the input/output (I/O) of the DPUs which then use their own digital processor to convert the sensor signals to parameter values which are used in the actual process control routines and/or are transmitted to other portions of the distributed processing system via the communications means.

As another aspect of the invention, the stimulation means provides the process signals, preferably the sensor signals, to the DPUs at the assigned scan frequencies of the different DPUs. The modeling means and the stimulation means exchange data through a reflective memory. The stimulation means also reads the control signals generated by the DPUs at the assigned frequency for each DPU and maps them to the modeling means through the reflective memory.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENT

Figure 1:
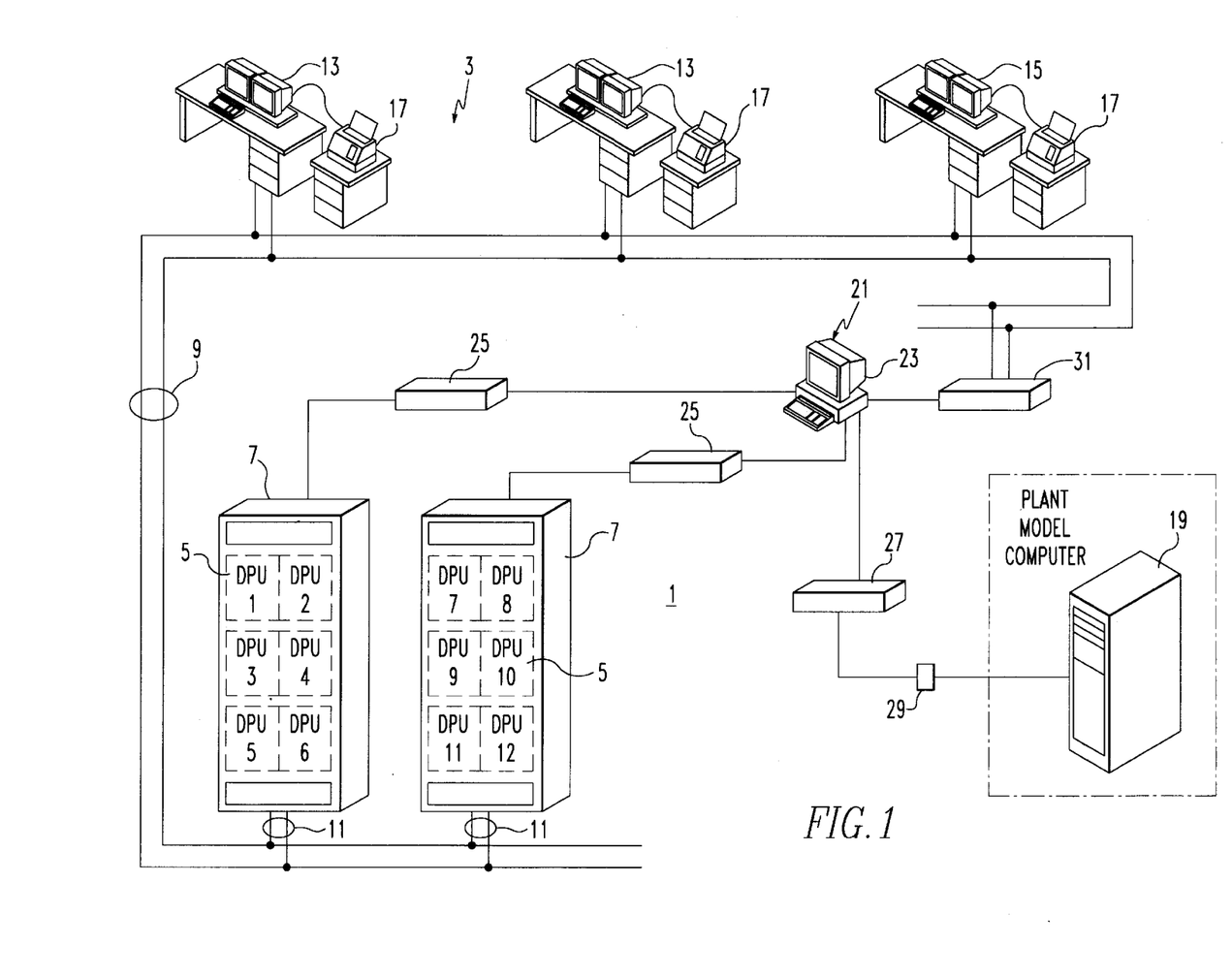
FIG. 1 is a block diagram of a stimulated simulator for a distributed process control system in accordance with the invention.

FIG. 1 provides a overall view of the architecture of a simulator 1 for simulating the operation of a process controlled by a distributed process control system in accordance with the invention. The simulator includes a distributed process instrumentation and control system 3 which is essentially a repackaged, non-redundant subset of the actual instrumentation and control equipment used in the plant, the operation of which is being simulated.

The instrumentation and control system 3 includes a plurality of distributed processing units (DPUs) 5, each of which controls a portion of the plant process in a manner known to those skilled in the art. In the illustrative system, there are twelve DPUs, $5_1$ to $5_{12}$, with six housed in each of two cabinets 7. The DPUs are connected together by a communications network in the form of a data highway 9. The individual DPUs 5 are connected to the data highway 9 by highway interfaces 11. The data highway also connects the DPUs to one or more operator stations 13 and to an engineer/historian station 15, as well as to other possible workstations comprising the I & C system man-machine interface layer. In the exemplary system, the operator stations 13 and engineer/historian station 15 are workstations. Peripherals 17, such printers, can be provided at these stations for generating hard copy output of system performance and for performing other collateral tasks.

The instrumentation and control system 3 can be, for instance, a Westinghouse Distributed Processing Family (WDPF) system. In such a system, the data highway 9 is a WESTNET highway which provides deterministic communications of real-time data, as well as file-transfer type communications via a democratic tokenpassing protocol. The WESTNET highway 9 is identical to that present in the actual plant, with the possible exception that certain isolation features (fiber optic media, etc.) are not implemented. The workstations 13 and 15 can be Unix workstations (WEStations) with peripherals, such as the printers 17, which provide the plant computer and man machine interface functionality, and are identical to those which would be present in the actual plant except that functionally redundant WEStations may not be provided. The WDPF DPUs 5 provide the data acquisition and control functions for the instrumentation process control system and are identical in function and number to those which are present in the actual plant except again, the DPUs are non-redundant and are repackaged to reduce the number of cabinets required in the simulator. In addition, the input/output (I/O) boards are not present in the simulator DPUs 5 as described below. Each of the DPUs 5 contains identical base and application software to that present in the actual plant equipment. While 12 DPUs housed in 2 cabinets are illustrated in the exemplary system, other numbers of DPUs and configurations can be utilized.

In the simulator 1, as well as in the actual plant, the operator controls the process through the operator stations 13. In the simulator, one of the stations can be manned by the student and the other by an instructor. The operator signals generated at the operator stations 13 are communicated to the DPUs over the data highway 9. The DPUs also exchange data where required over the data highway 9. The DPUs 5 receive inputs from the process such as sensor signals and status logic signals and use process control software to generate control signals which are provided to the process in response to the sensor and status signals, as well as to the operator signals. The simulator 1 operates in a similar manner, except that the process is replaced by a process model which is implemented in a plant model computer 19. Many plants have simulation systems which include such plant models which are used for analyzing plant operation, including postulated abnormal conditions and system modifications. The simulator 1 allows the existing plant models in the plant simulator to be used for the stimulation of the I & C system interface. The interface between the instrumentation and control system 3 and the plant model computer 19 is provided by a simulator interface 21 which comprises a workstation 23, such as a WEStation, SBUS expansion chassis 25 providing SBUS adaptors connecting the simulator workstation with the DPUs 5, and an interface 27 between the simulator workstation 23 and the plant model computer 19. As will be described more fully, the interface 27 includes a reflective memory interface 29. The simulator workstation 23 is also connected to the data highway 9 through highway interface electronics 31.

Figure 2A:
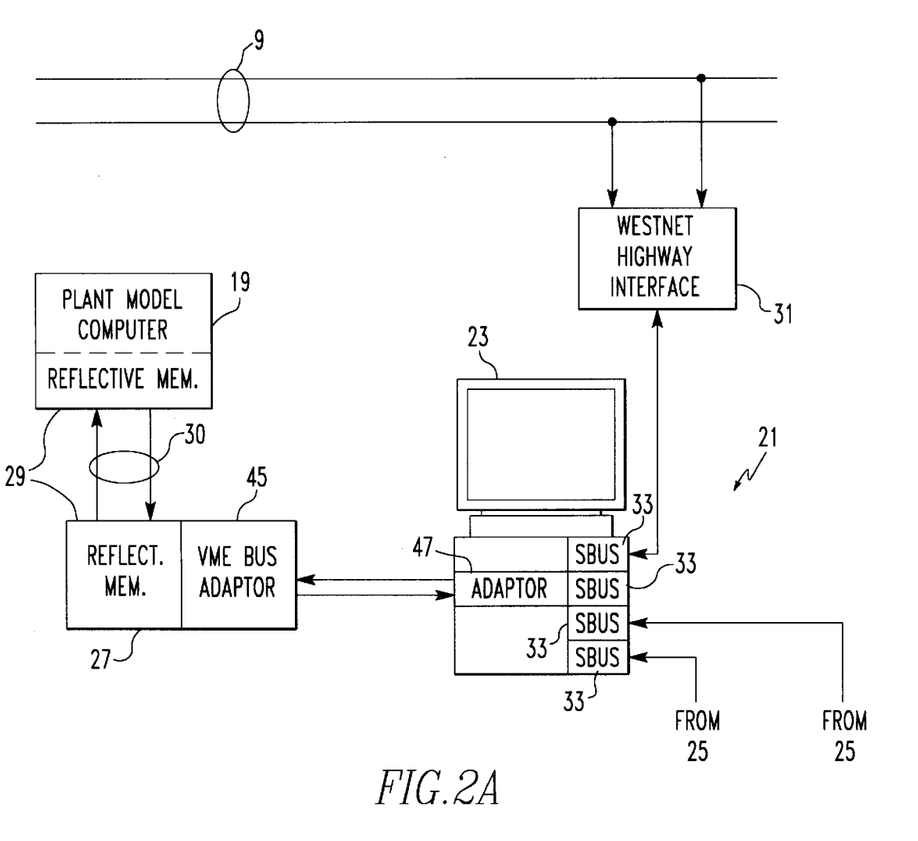
FIGS. 2A and B provide a more detailed block diagram illustrating the interconnection of pertinent components of the simulator of FIG. 1.
Figure 2B:
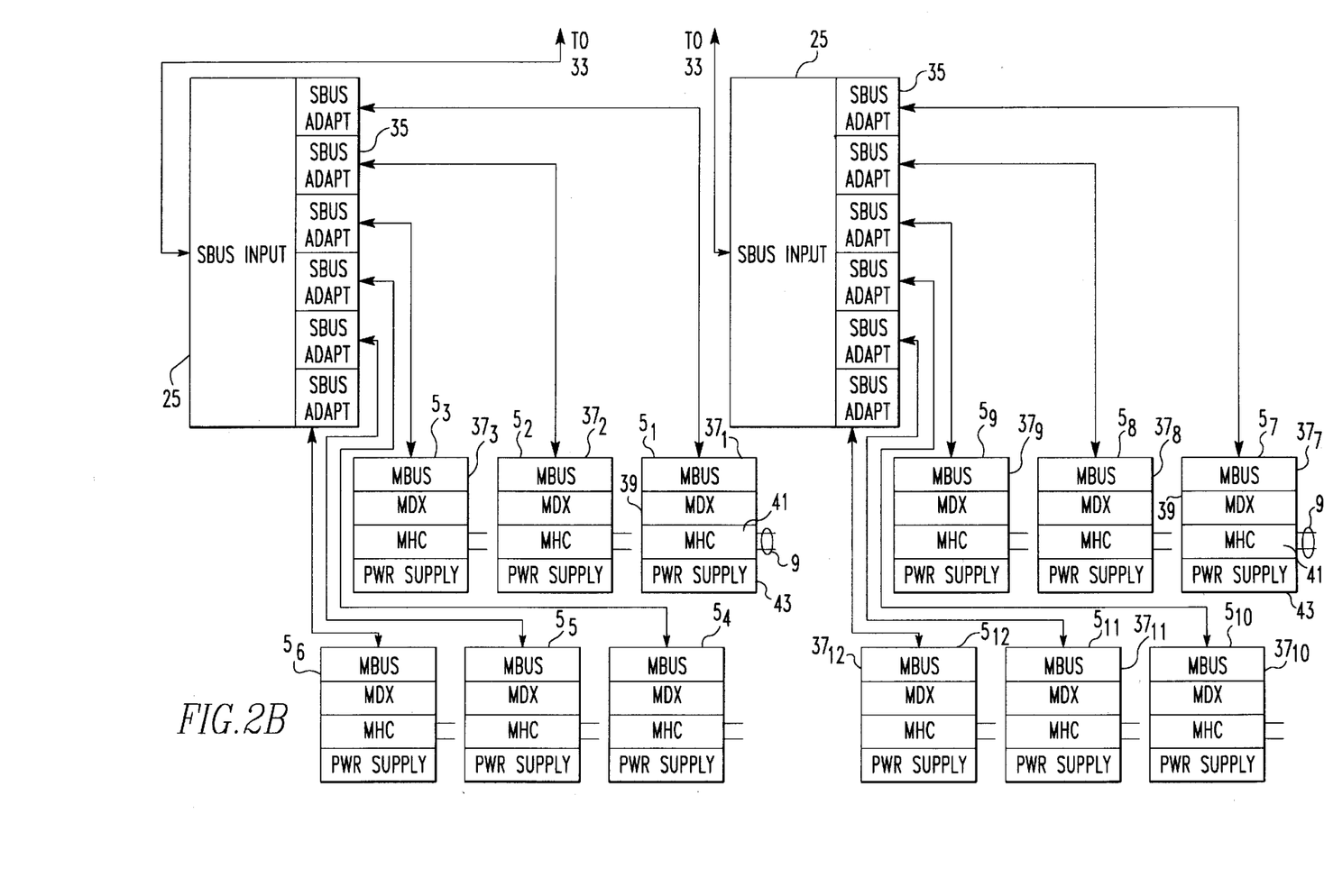

FIGS. 2A and B illustrate in more detail the manner in which the simulator interface 21 provides communication between the plant model computer 19 and the DPUs 5 of the instrumentation and control system 3. In the illustrative simulator 1, the workstation 23 of the simulator interface 21 is a SUN SPARC workstation which utilizes an SBUS architecture. The SBUS expansion chassis 25 connected to SBUS connections 33 of the workstation provide an SBUS adaptor 35 for each of the six DPUs 5 served by the chassis. Each of the DPUs $5_1$ to $5_{12}$ utilize MULTIBUS architecture. Adapters $37_1$ to $37_{12}$ interface the respective DPUs with the simulator workstation 23 through the SBUS adapters 35 in the expansion chassis 25. The DPUs $5_1$ to $5_{12}$ each have a digital processor (on MDX board 39) in which the process control software is run. The DPUs also include highway controllers (MHC boards) 41 which connect the DPUs to the data highway 9 for communication with the other DPUs and with the operator stations 13 and the engineer/historian station 15. Each of the DPUs also include their own power supply 43.

The simulator workstation 23 communicates with the plant model computer 19 through the reflective memory 29 which resides in both the interface 27 and the plant model computer 19. The reflective memory 29 in the plant model computer 19 and the interface 27 are connected via a fiber optic ring communications network 30. As the plant model computer 19 and the reflective memory 29 have VME buses, a bus adaptor 45 in the unit 27 and the adaptor 47 in SBUS connection 33 of workstation 23 provide the hardware interface for the exchange of data and control signals. As mentioned in connection with FIG. 1, the interface 31 connects the simulator workstation 23 with the data highway 9. This is effected through another SBUS connection 33. The reflective memory interface 29 between the simulator workstation 23 and the plant model computer 19 permit protocolless data transfer between the plant model computer and the instrumentation and control system 3.

The primary function of the simulator workstation 23 is to map data values and status information between the plant model computer 19 and the DPUs 5, and also to respond to the simulator control functions such as run/freeze, load/save of initial condition (IC) sets, snapshot, backtrack, and others. The freeze control function permits the simulation to be stopped at any point for review with the student or for analysis. The save function stores a set of conditions at a point in the operation of the system which can be recalled at a later time. The load function loads the initial conditions for a designated save function into the DPUs to start the simulation under the selected conditions. The snapshot function is similar to the save except that the initial conditions are saved on the fly and is transparent to the operator. With the backtrack function, an instructor can recall a series of snapshots to review student performance or progression of plant operation.

Figure 3:
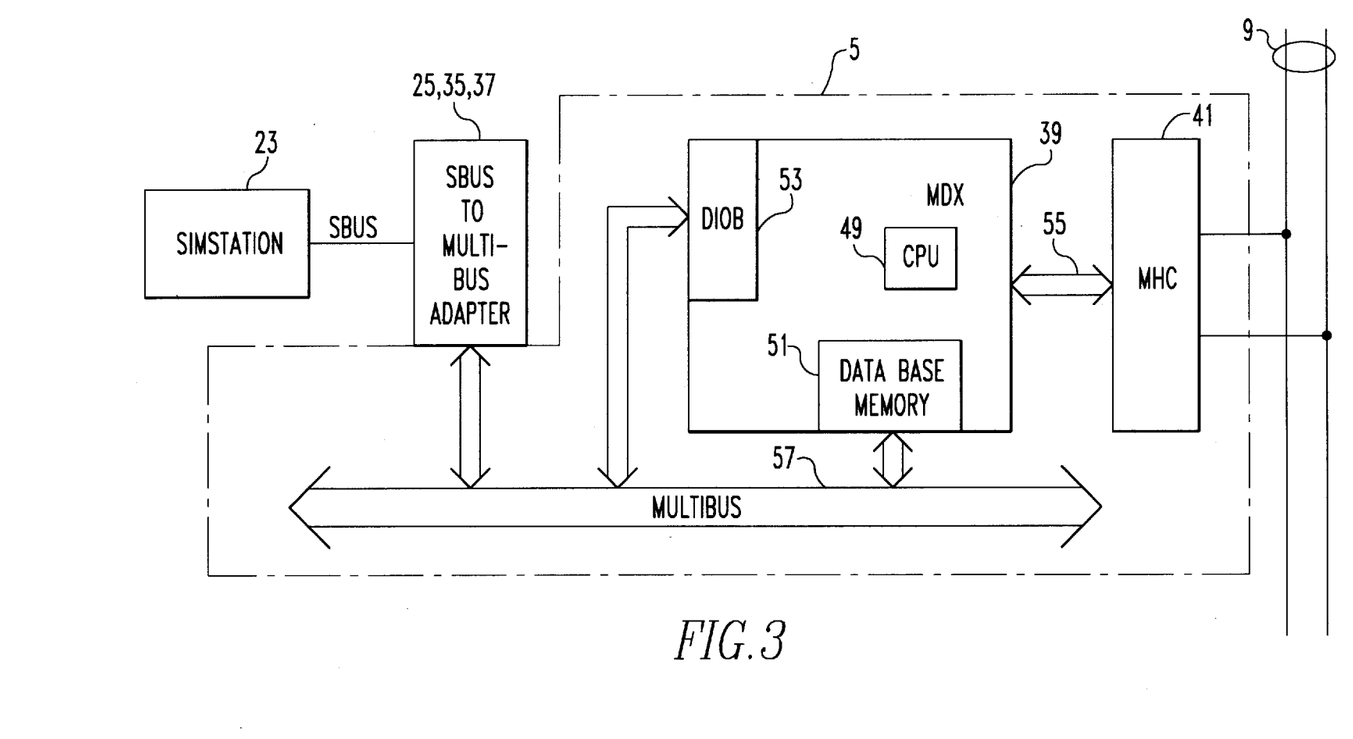
FIG. 3 is a block diagram illustrating the components of the stimulated distributed processing units which are part of the simulator system of FIGS. 1 and 2.

FIG. 3 illustrates in more detail the pertinent structure of the DPUs 5. The heart of the DPU is the MDX board 39 on which is implemented a digital processor in the form of a microcomputer having a central processing unit (CPU) 49 and a data base memory 51. The MDX board 39 also has a memory mapped input/output (I/O) interface (DIOB) 53. The DIOB interface 53 contains the analog to digital equivalent of analog signals and logic signals typically scanned by I/O cards in the actual plant (not shown). In the stimulated system interface the simulated interface populates this memory 53 with the appropriately converted digital values corresponding to sensor values received from the plant model computer 19. Periodically, the processor 49 retrieves the digitized sensor signals from the DIOB 53 for use in implementing algorithms of the control software. These algorithms generate control signals which are then stored in the DIOB 53 for output to the valves motors and other active components of the plant. Of course, in the simulator these components as well as the process being controlled are emulated in the plant model computer 19.

The database memory 51 stores the various point values generated by the distributed process control software. As mentioned, some of these data points generated by some of the DPUs are also used by other DPUs. The interchange of these data point values is implemented over the communications network 9 by the network controller mounted on the MHC board 41. The MHC board 41 communicates with the MDX board through a proprietary bus 55.

As also previously mentioned, the various routines run by the DPUs can have different I/O and control frequencies. Typically, routines having a common I/O frequency are grouped in a single DPU. The I/O frequency determines the rate at which the DIOB memory 53 is updated. The control frequencies determine the rate at which the CPU 49 reads and writes to the DIOB 53. In accordance with the invention, the simulator station 23 maps sensor signal values generated by the plant model computer 19 directly into the DIOB 53 at the I/O frequency of the associated DPU 5. This is accomplished by utilizing the MULTIBUS 57 and the interface 37 which passes signals between the SBUS of the simulator station 23 and the MULTIBUS 57 of the DPU. Thus, the simulator station 23 can directly read and write signal data to and from the DPU without introducing the latency inherent in communications over the data highway 9. This direct interface also allows the simulator station 23 to frequency match its communication with the DPUs to the actual system timing configuration or input/output scans, control calculations, and so forth. This insures that the time response characteristics of the simulator will be identical to those of the plant. This direct interface also simplifies the response to simulator control functions such as run/freeze, load/save, initial condition sets, snapshot, backtrack, etc. For example, run/freeze is controlled by enabling/suspending the DPU I/O scans and control tasks. The save function is implemented by transmitting a snapshot of the database memory 51 and DIOB memory 53 to the simulator station 23 using an initial condition (IC) number as a reference. The load function is implemented by loading the IC set directly into the database memory 51 and the DIOB memory 53. The backtrack function is implemented by sequentially transferring IC sets to the DPUs.

Figure 4:
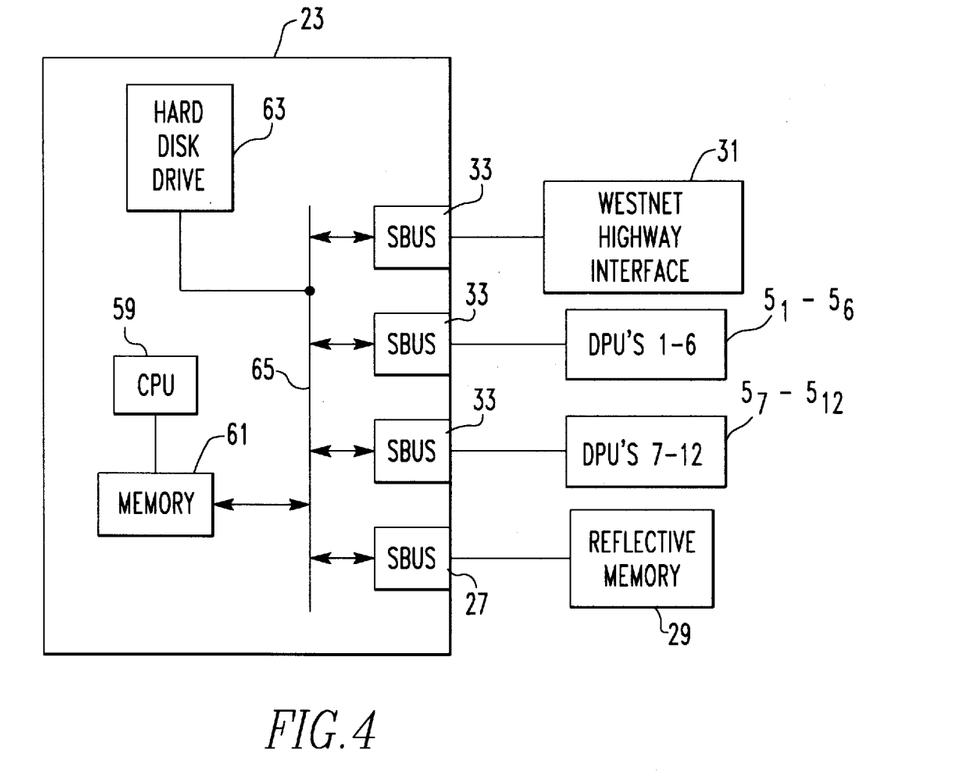
FIG. 4 is a block diagram illustrating the components of the simulator station which forms part of the simulator system.

FIG. 4 illustrates the pertinent elements of the simulator workstation 23. The illustrative workstation 23 has a CPU 59 and a random access memory (RAM). It also has an internal hard disk 63 for storing IC files and other information. The simulator station 23 has an SBUS 65 which is interfaced with the DPUs 5 through the SBUS connectors 33 and the SBUS expansion chassis (not shown in FIG. 4). The simulator station 23 communicates with the plant model computer 19 through reflective memory 29 and the SBUS adaptor 27. Also, the simulator station 23 communicates over the data highway 9 through the WESTNET highway interface 31 and the SBUS connection 33. Thus, simulator station 23 provides a single connection between the plant model computer 19 and each of the DPUs 5. This makes it convenient to use existing plant model computers 19 in the simulator.

Figure 5A:
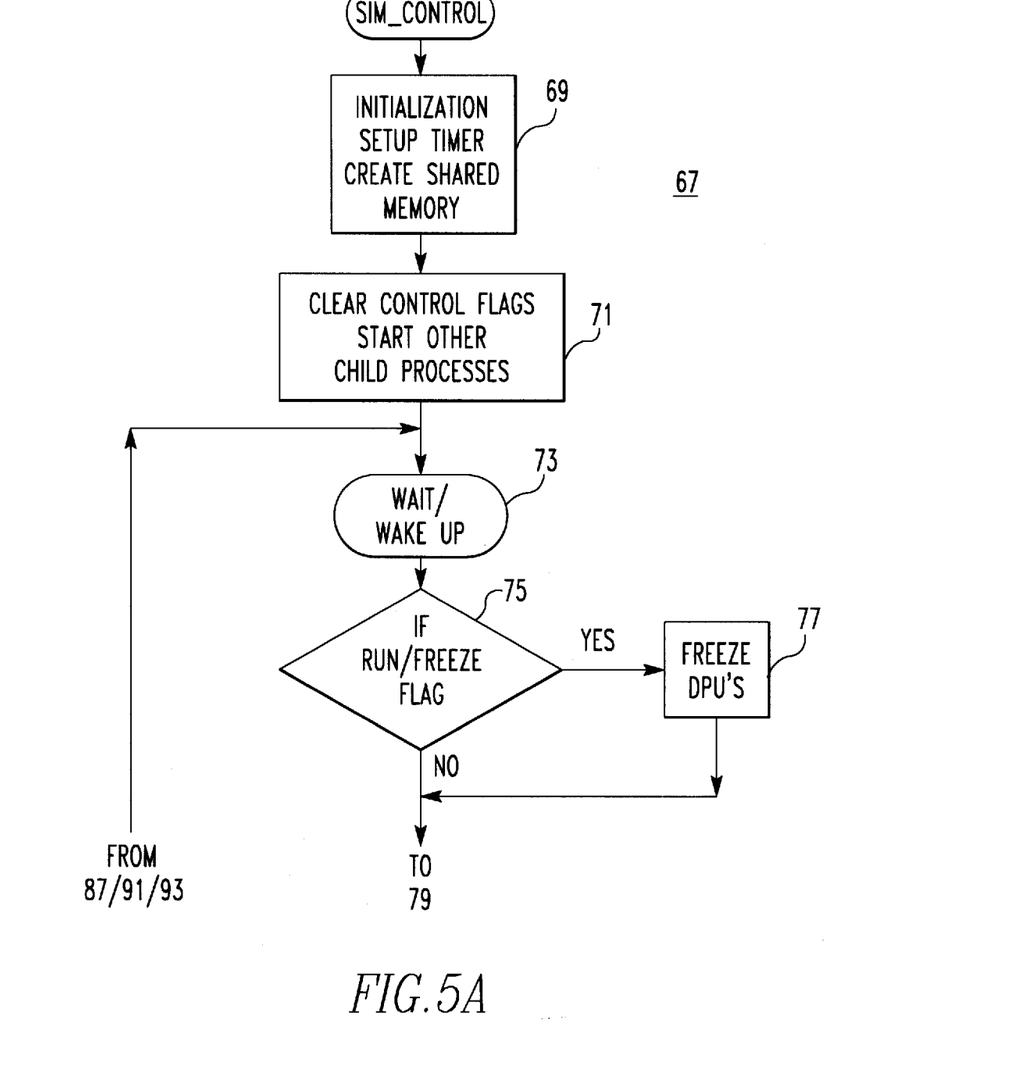
FIGS. 5A and B illustrate a flow chart of the simulator control program run by the simulator station of FIG. 4.
Figure 5B:
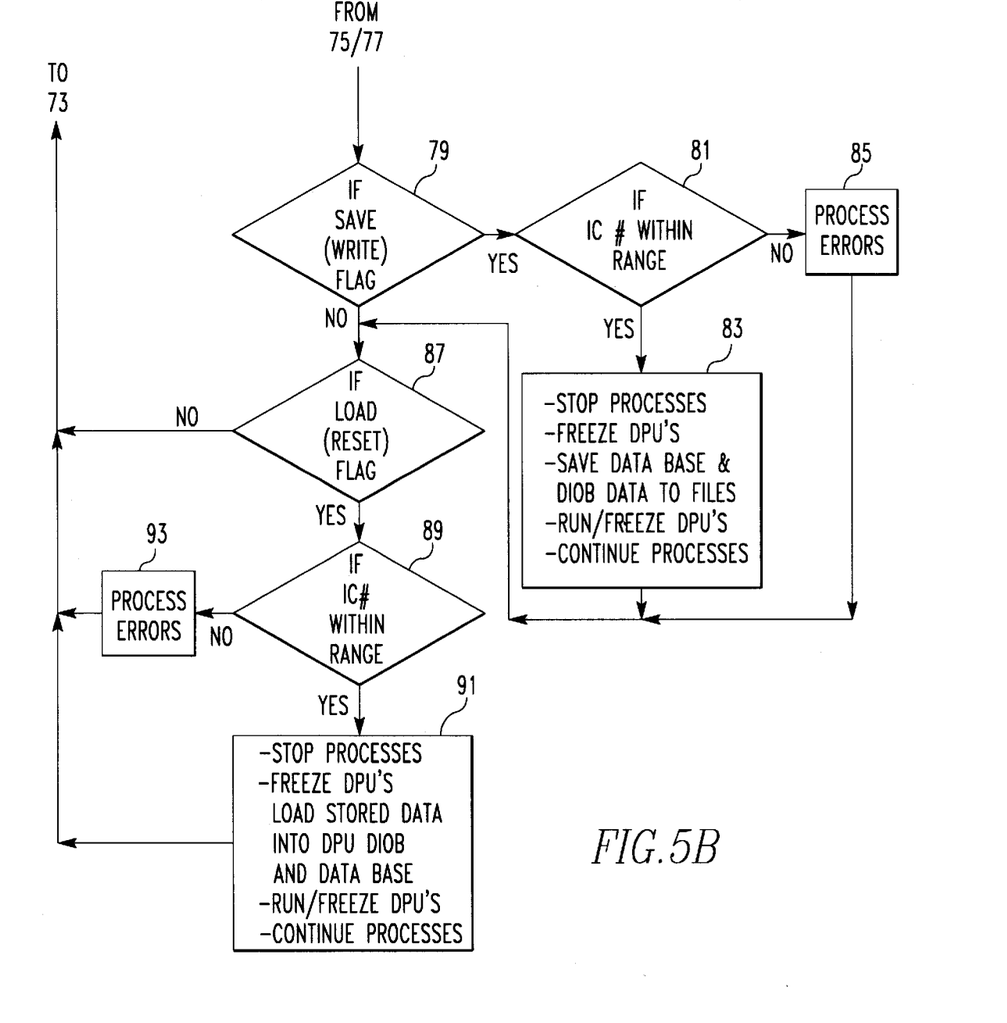

FIG. 5 illustrates a flow chart of the SIM_CONTROL routine 67 run by the simulator workstation 23. Upon first being called at 69, initialization tasks are performed including setting-up a configurable timer which repetitively recalls the routine at the desired rate. Shared memory is also created to manage intertask communications within the simulator workstation 23. The control flags from the plant model computer are then cleared at 71. This does not include clearing a freeze flag if the model were in the freeze state. Other processes run by the simulator workstation are also started at 71, (including the SIM_MAP tasks described below).

The routine then waits at 73 for an interrupt generated by the internal timer. When the timer times out, the run/freeze flag is checked at 75 and if it is set to freeze, the DPUs 5 are frozen at 77. This is accomplished by setting a control bit in the DIOB 53 of each of the DPUs. If a save (write) flag is detected at 79, and if the initial condition (IC) number is within range, as determined at 81, then the simulator workstation performs a number of functions indicated at 83. This includes first stopping the processes created at 71 and freezing the DPUs 5. Then the data stored in the database memory 51 and the DIOB 53 are saved to files in the simulator workstation. Once this is accomplished, the system is returned to the run or freeze state it was in prior to the save command and the stopped processes in the simulator workstation are continued. If the IC number is not in range, a process error is generated at 85 and transmitted to the operator station over the data highway. If the load (reset) flag is set at 87 and the IC number is within range as determined at 89, then the sequence indicated at 91 is initiated. This includes stopping the processes created at 71 and freezing the DPUs. The data stored under the selected IC number is then loaded into the DIOB memories 53 and database memories 51 of the DPUs 5. The DPUs are then returned to the run or freeze state existing at the time that a load flag was detected, and the stopped processes in the simulated workstation are continued. When these steps are completed, the routine returns to 73 and waits for the next time interrupt. If the IC number was not in range at 89, a process error indication is generated at 93 before the routine returns to 73 to wait for the next interrupt. Similarly, the routine returns to 73 if no load flag is set at 87.

Figure 6:
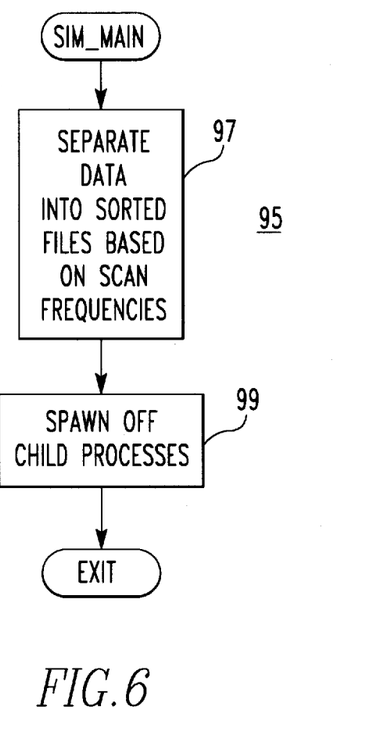
FIG. 6 is a block diagram of the main routine run by the simulator station of FIG. 4.
Figure 7:
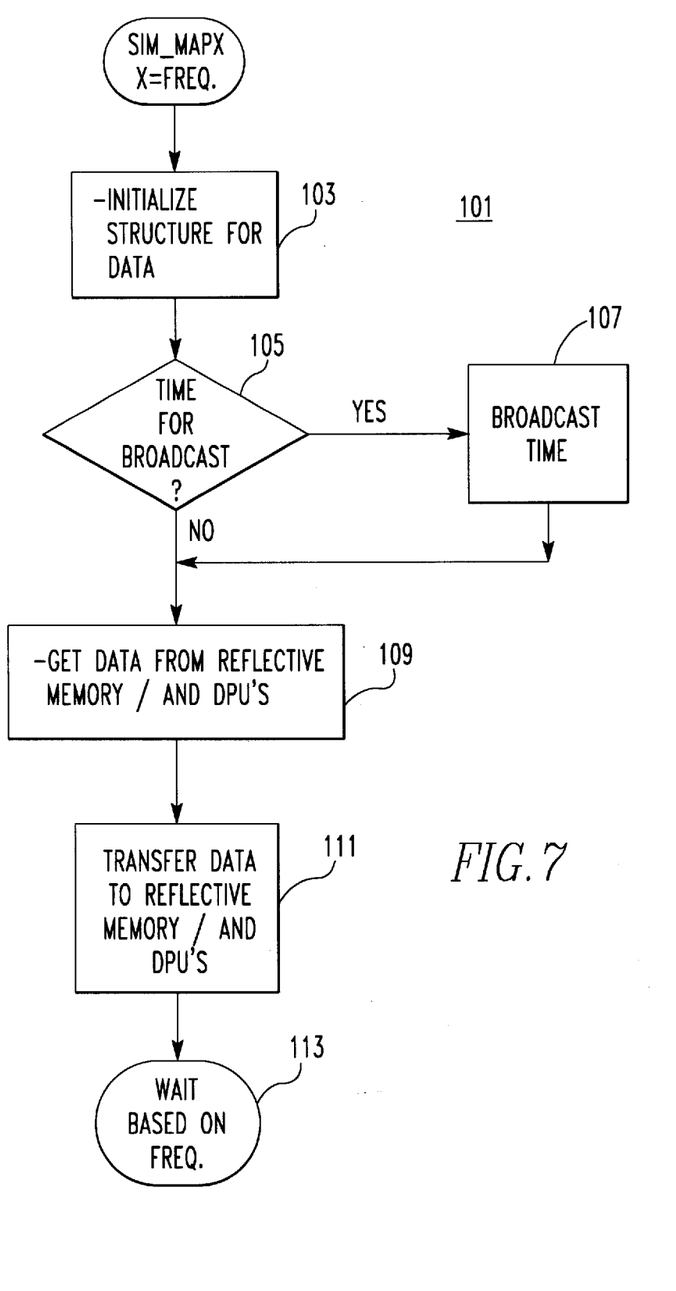
FIG. 7 is a block diagram of the mapping routines run by the simulator station of FIG. 4.

FIG. 6 illustrates a flow chart of the simulator main routine, SIM_MAIN 95. This main routine determines the scan frequencies of the various DPUs and separates the data into sorted files based upon these scan rates at 97. It then spawns off the child processes at 99 including the mapping routine 101 which is shown in FIG. 7. This routine 101 maps data from the plant model computer including the sensor signals to the appropriate DPUs at the assigned I/O frequency for each DPU. Thus, this routine is repeated for each of the scan frequencies. First, the data structure is initialized at 103 by initializing the data points in memory of the simulator station 23. Periodically, the simulator station 23 broadcasts a timing signal to the communication interface 9 for synchronization of the distributed system. If the broadcast time has been reached at 105, the timing signal is broadcast at 107. In any event, the routine gathers data generated by the plant model computer from the reflective memory and data from the DPUs at 109. The data from the plant model computer is transferred to the appropriate DPUs and vice versa at 111. The routine then waits at 113 for the next cycle based upon the frequency. As mentioned, a similar routine is run for each of the assigned DPU frequencies. It will be understood that all of the DPUs having the same assigned frequency can be serviced by the same routine.

The stimulated simulator interface architecture described above offers many advantages to emulation of the same functionality and to the distributed process control simulator described in U.S. patent application Ser. No. 08/282,854. One of the primary advantages of stimulation over emulation, is that the system is an actual representation of the identical process control system used in the plant. Thus, the stimulated system incorporates the actual plant to man-machine interface (windows, process diagram displays, alarm lists, system diagnostics and so forth). There is no need to emulate this MMI functionality with the accompanying difficulty. The stimulated system also provides absolute reusability of the plant process control software. There is no doubt that the simulator contains identical functionality to the plant; in fact, the simulator can be used as a software test bed for the plant software. The stimulated system also matches the actual system, both with respect to the design intent as well as unintended features, for example, software bugs. Any problems inherent in the actual system will also be present in the simulator, thereby leading to earlier detection/diagnosis. The system response is also identical to that of the plant.

One of the major difficulties in emulation is replication of system response time. This difficulty is alleviated in the stimulated system since the system timing characteristic is repeated in the interface. All drops (DPUs and operator stations) are running at the same frequencies as in the plant. Timing interactions between the distributed drops is also identical to the plant by default.

The cost of the stimulated system is also reduced over emulation. Initially, the cost tradeoff for emulation versus stimulation is one of software versus hardware. Development of simulation software to emulate the software in the process control system can be quite costly. In fact, these costs may be greater than that of the software in the actual plant, in that the simulator must emulate both applications and base operating systems software, while only applications software needs to be developed for the plant, as the base software is reused from project to project. In comparison the reduced hardware set necessary for the stimulated solution results in a reasonable initial system cost. The developed architecture removes a large portion of the hardware costs associated with the actual plant system by removing the I/O hardware and redundancy. On the other hand, the stimulated simulator of the invention remains truer to the actual plant timing and validates more of the software than the distributed processing simulator of the above-cited patent application, by memory mapping process sensor values to the I/O interface of the DPUs so that the DPUs still exercise their conversion routines.

Another major advantage of the stimulated simulator of the invention is the reduced maintenance and upgrade costs. In an emulated system, upgrade costs associated with maintenance of the emulation software can be quite substantial. In a simulated system, there is virtually no maintenance costs associated with software upgrades not affecting the plant interface. The system can be upgraded by simply reloading the new plant application software. The system of the invention was designed with upgradability and maintenance as a design basis. This is accomplished by isolating the configuration of the interface between the plant model computer and the remainder of the instrumentation and control system to the simulator workstation. The simulator workstation configuration is via a map file, which simply associates plant model computer "points" with instrumentation and control system data points. The map file is a text file that describes each point with respect to its data type, direction of data flow, and offset into reflective memory. The remainder of data about each point, such as for instance, scan/frequency, is gleaned on line from the instrumentation and control system software itself. The interface is designed to map data at the I/O level. In other words, data is mapped according to its sensor units (volts, amps, etc.), identical to the plant interface. All data conversions to engineering values, digital sense inversion, etc., are performed using actual plant software.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A simulator for simulating operation of a process controlled by a distributed process control system, said simulator comprising:

modeling means for modeling said process in response to control signals and for providing sensor signals representative of sensor values of process parameters resulting from modeling of said process in response to said control signals;

a plurality of distributed processing units (DPUs) having input/output (I/O) means for receiving and storing said sensor signals and outputting said control signals, and digital processing means for converting said sensor signals to parameter values and for generating said control signals using actual process control software in response to said parameter values and to operator signals;

an operator console for generation of said operator signals by an operator;

communication means providing communication between said plurality of DPUs and between said plurality of said DPUs and said operator console; and stimulation means connected to each of said DPUs and to said modeling means for transmitting said sensor signals from said modeling means to said I/O means of said DPUs and for transmitting said control signals from said DPUs to said modeling means.

2. The simulator of claim 1 wherein said digital processing means of each of said DPUs has an assigned scan rate at which said digital processing means scans said I/O means for acquiring said sensor signals, and wherein said stimulating means has means providing said sensor signals from said modeling means to the I/O means of each of said DPUs at least at said assigned scan rate of the digital processing means for the DPU.

3. The simulator of claim 2 wherein said stimulation means includes means providing said sensor signals from the modeling means to the I/O means of each of said DPUs at a selected multiple of the assigned scan rate of the digital processing means of the DPU.

4. The simulator of claim 3 wherein said stimulation means includes means providing said sensor signals from the modeling means to the I/O means of each of said DPUs at said assigned scan rate of the digital processing means for the DPU.

5. The simulator of claim 2 wherein said modeling means and said stimulation means each include reflective memory means for transmitting said sensor signals and control signals between said modeling means and said stimulation means.

6. The simulator of claim 2 wherein said stimulation means includes means freezing simulation of said process by said modeling means and means suspending said transmitting of said sensor signals to said DPUs and freezing generation of said control signals by said digital processing means.

7. A simulator for simulating operation of a process controlled by a distributed process control system, said simulator comprising:

modeling means for modeling said process in response to control signals and for providing process signals resulting from modeling of said process in response to said control signals;

plurality of distributed processing units (DPUs) each comprising digital processing means having means utilizing said process signals at an assigned rate for generating said control signals using actual process control software in response to said process signals and to operator signals;

an operator console for generation of said operator signals by an operator;

communication means providing communication between said plurality of DPUs and between said plurality of DPUs and said operator console; and stimulation means connected to each of said DPUs and to said modeling means for transmitting said process signals from said modeling means to said digital processing means of each DPU at said assigned rate for the digital processing means of the DPU.

8. The simulator of claim 7 wherein said stimulation means comprises means transmitting said control signals from said DPUs to said modeling means at said assigned rate.

9. The simulator of claim 7 wherein said stimulation means and modeling means have reflective memory means for transmitting said process signals and control signals between said modeling means and said stimulation means.

10. The simulator of claim 9 wherein said DPUs have input/output (I/O) means for receiving said process signals, and wherein said stimulation means includes means inserting said process signals into said I/O means at said assigned scan rate for the DPU.

* * * * *